United States Patent
Vedantham et al.

(10) Patent No.: US 9,231,657 B2
(45) Date of Patent: Jan. 5, 2016

(54) ADAPTIVE SUB-BAND ALGORITHM FOR POINT-TO-POINT COMMUNICATION IN PLC NETWORKS

(71) Applicant: Texas Instruments Incorporated, Dallas, TX (US)

(72) Inventors: Ramanuja Vedantham, Allen, TX (US); Kumaran Vijayasankar, Dallas, TX (US); Xiaolin Lu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 120 days.

(21) Appl. No.: 13/738,883

(22) Filed: Jan. 10, 2013

(65) Prior Publication Data

US 2013/0182719 A1    Jul. 18, 2013

Related U.S. Application Data

(60) Provisional application No. 61/586,216, filed on Jan. 13, 2012.

(51) Int. Cl.
*H04J 3/24* (2006.01)
*H04B 3/54* (2006.01)
*H04L 25/02* (2006.01)

(52) U.S. Cl.
CPC .................. *H04B 3/542* (2013.01); *H04B 3/54* (2013.01); *H04L 25/0286* (2013.01)

(58) Field of Classification Search
CPC ................... H04B 3/542; H04B 3/544; H04B 2203/5408; H04B 2203/5483; H04B 2203/5466; H04B 3/54; H04B 2203/5416; H04B 2203/5412

USPC .......................................... 370/347, 461, 474
See application file for complete search history.

(56) References Cited

U.S. PATENT DOCUMENTS

| | | | | |
|---|---|---|---|---|
| 7,173,935 B2 * | 2/2007 | Lou et al. | ................... | 370/395.5 |
| 7,382,232 B2 * | 6/2008 | Gidge et al. | ............... | 340/12.32 |
| 7,561,062 B2 * | 7/2009 | Schleich et al. | ......... | 340/870.02 |
| 7,756,078 B2 * | 7/2010 | Wyk et al. | ...................... | 370/328 |
| 7,802,015 B2 * | 9/2010 | Cheifot et al. | ................ | 709/248 |
| 7,885,246 B2 * | 2/2011 | Kuroda et al. | ................ | 370/347 |
| 7,986,718 B2 * | 7/2011 | Monier | ......................... | 370/509 |
| 8,054,821 B2 * | 11/2011 | Monier et al. | .............. | 370/350 |
| 8,139,614 B2 * | 3/2012 | Razazian et al. | .............. | 370/503 |
| 8,179,917 B2 * | 5/2012 | Chan et al. | ..................... | 370/466 |
| 8,320,233 B2 * | 11/2012 | Razazian et al. | ............. | 370/208 |
| 8,325,759 B2 * | 12/2012 | Hazani et al. | ................. | 370/466 |

(Continued)

*Primary Examiner* — Brian O'Connor
(74) *Attorney, Agent, or Firm* — Steven A. Shaw; Frank D. Cimino

(57) ABSTRACT

Embodiments of methods and systems for adaptive sub-band point-to-point communication are presented. In one embodiment a method includes performing functions using a power line communication (PLC) transmitter device. The method may include generating a first data packet having a first adaptive sub-band information set, the first sub-band information set comprising information to be used by a PLC receiver for determining a sub-band hopping pattern. The method may also include transmitting the first data packet on a first PLC sub-band. Additionally, the method may include hopping to a second PLC sub-band, and generating a second data packet having a second adaptive sub-band information set, the second sub-band information set comprising information to be used by the PLC receiver for determine the sub-band hopping pattern. The method may further include transmitting the second data packet on the second PLC sub-band.

17 Claims, 5 Drawing Sheets

(56) References Cited

U.S. PATENT DOCUMENTS

| | | | |
|---|---|---|---|
| 8,364,326 B2* | 1/2013 | Xia et al. | 700/295 |
| 8,482,402 B2* | 7/2013 | Galli et al. | 340/539.1 |
| 8,619,789 B2* | 12/2013 | Hui et al. | 370/395.62 |
| 8,780,691 B2* | 7/2014 | Razazian et al. | 370/208 |
| 8,780,953 B2* | 7/2014 | Shaffer et al. | 375/132 |
| 8,879,379 B1* | 11/2014 | Razazian et al. | 370/208 |
| 2003/0038710 A1* | 2/2003 | Manis et al. | 340/310.01 |
| 2007/0230377 A1* | 10/2007 | Nosaka et al. | 370/294 |
| 2008/0153430 A1* | 6/2008 | Yonge, III | 455/73 |
| 2010/0074304 A1* | 3/2010 | Flammer, III | 375/134 |
| 2010/0322322 A1* | 12/2010 | Kodama et al. | 375/257 |
| 2012/0218120 A1* | 8/2012 | Ree et al. | 340/870.02 |
| 2013/0016759 A1* | 1/2013 | Hui et al. | 375/135 |
| 2013/0181847 A1* | 7/2013 | Willig et al. | 340/870.03 |

\* cited by examiner

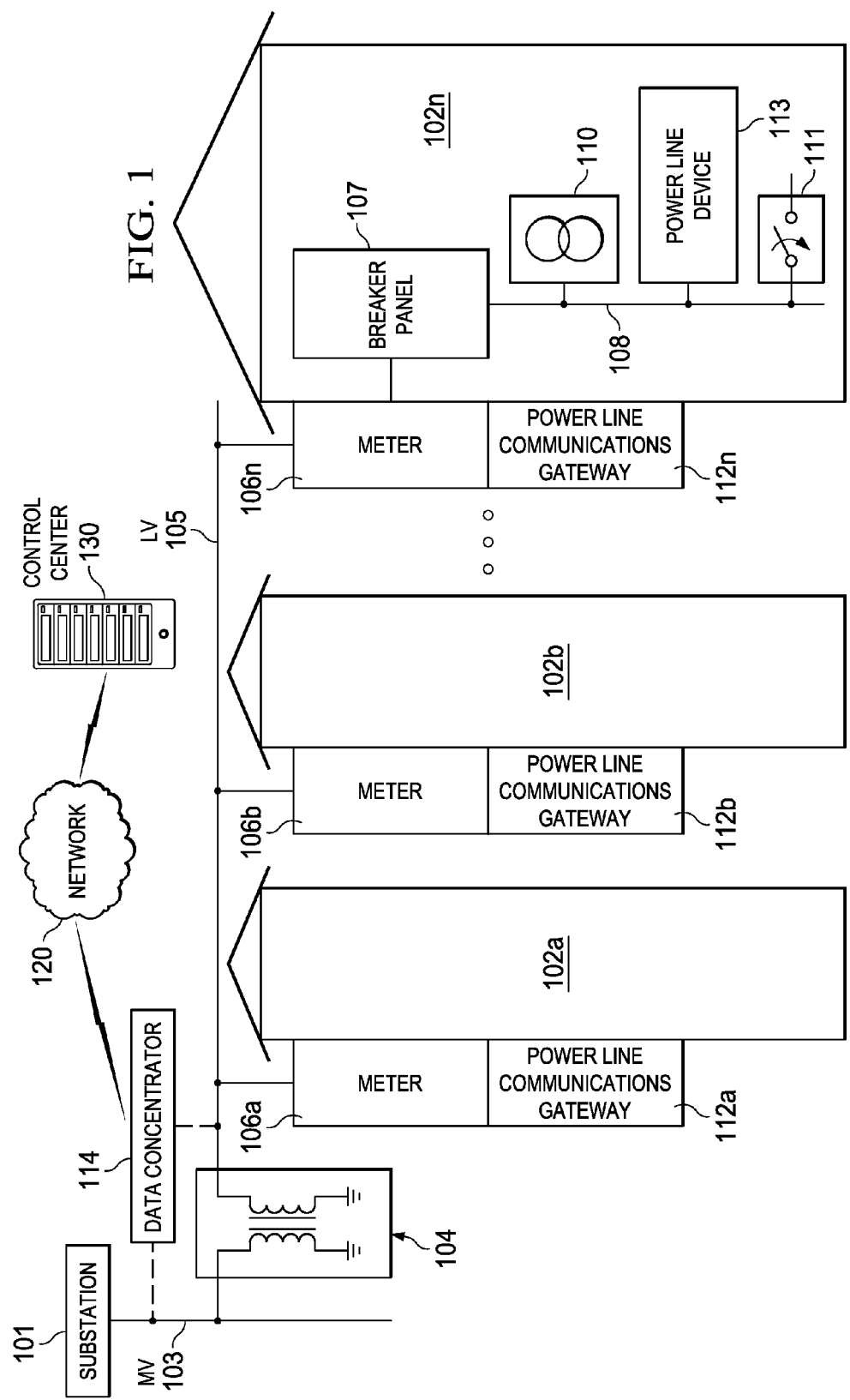

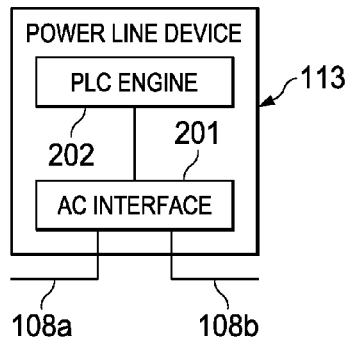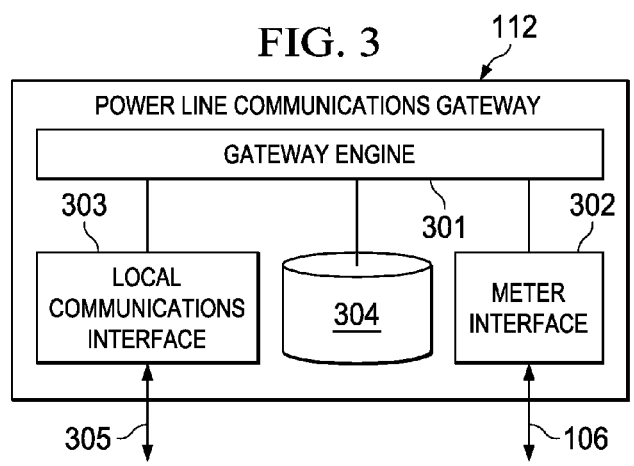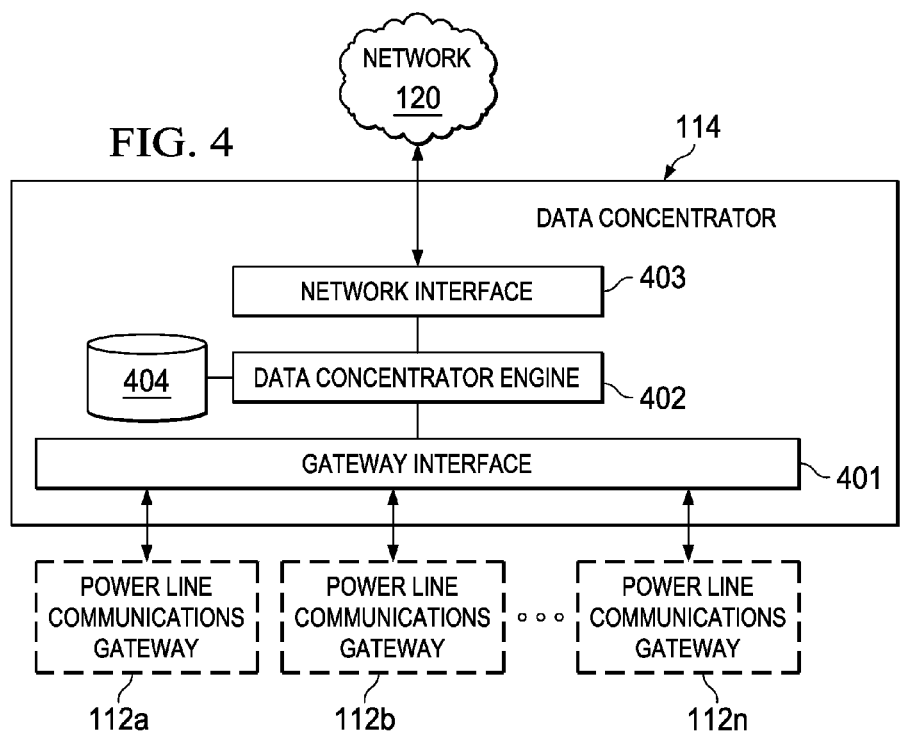

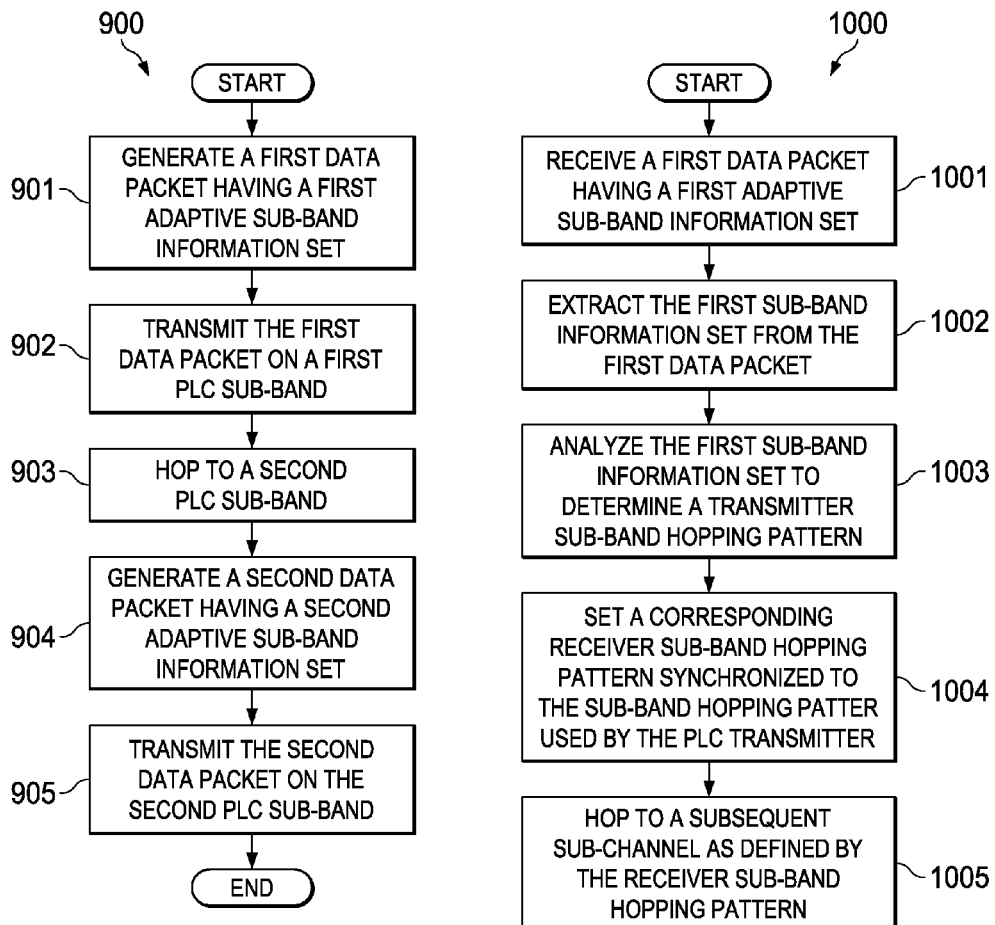
FIG. 9
FIG. 10
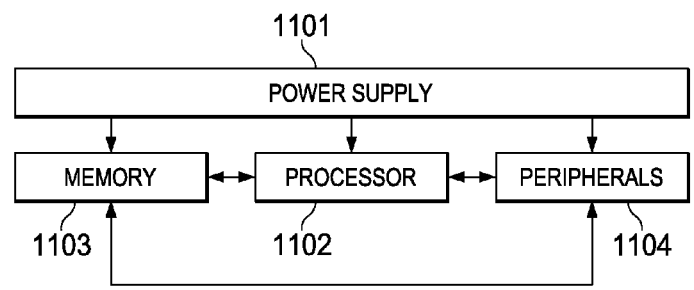
FIG. 11

ADAPTIVE SUB-BAND ALGORITHM FOR POINT-TO-POINT COMMUNICATION IN PLC NETWORKS

CROSS-REFERENCE TO RELATED APPLICATIONS

This application claims the benefit of the filing date of U.S. Provisional Patent Application No. 61/586,216, which is titled "Adaptive Sub-band Algorithm for Point-to-Point Communication in PLC Networks" and was filed on Jan. 13, 2012, the disclosure of which is hereby incorporated by reference herein in its entirety.

TECHNICAL FIELD

Embodiments of the invention are directed, in general, to Power Line Communications (PLC) and, more specifically, to methods for adaptive sub-band point-to-point communication.

BACKGROUND

Power line communications (PLC) include systems for communicating data over the same medium that is also used to transmit electric power to residences, buildings, and other premises, such as wires, power lines, or other conductors. In its simplest terms, PLC modulates communication signals over existing power lines. This enables devices to be networked without introducing any new wires or cables. This capability is extremely attractive across a diverse range of applications that can leverage greater intelligence and efficiency through networking. PLC applications include utility meters, home area networks, lighting, and solar.

Using PLC to communicate with utility meters enable applications such as Automated Meter Reading (AMR) and Automated Meter Infrastructure (AMI) communications without the need to install additional wires. Consumers may also use PLC to connect home electric meters to an energy monitoring device or in-home display monitor their energy consumption and to leverage lower-cost electric pricing based on time-of-day demand.

As the home area network expands to include controlling home appliances for more efficient consumption of energy, OEMs may use PLC to link these devices and the home network. PLC may also support home and industrial automation by integrating intelligence into a wide variety of lighting products to enable functionality such as remote control of lighting, automated activation and deactivation of lights, monitoring of usage to accurately calculate energy costs, and connectivity to the grid.

PLC may also serve as an important enabling technology for the mass deployment of solar equipment by providing a communication channel to solar inverters for monitoring and managing power across the grid by utility companies. While radio frequency (RF) communications have made some progress in solar installations, PLC offers an ideal means for connecting equipment with high reliability and at a low cost on DC or AC lines.

PLC is a generic term for any technology that uses power lines as a communications channel. Various PLC standardization efforts are currently in work around the world. The different standards focus on different performance factors and issues relating to particular applications and operating environments. Two of the most well-known PLC standards are G3 and PRIME. G3 has been approved by the International Telecommunication Union (ITU). IEEE is developing the IEEE P1901.2 standard that is based on G3. Each PLC standard has its own unique characteristics.

The manner in which PLC systems are implemented depends upon local regulations, characteristics of local power grids, etc. The frequency band available for PLC users depends upon the location of the system. In Europe, PLC bands are defined by the CENELEC (European Committee for Electrotechnical Standardization). The CENELEC-A band (3 kHz-95 kHz) is exclusively for energy providers. The CENELEC-B, C, D bands are open for end user applications, which may include PLC users. Typically, PLC systems operate between 35-90 kHz in the CENELEC A band using 36 tones spaced 1.5675 kHz apart. In the United States, the FCC has conducted emissions requirements that start at 535 kHz and therefore the PLC systems have an FCC band defined from 154-487.5 kHz using 72 tones spaced at 4.6875 kHz apart. In other parts of the world different frequency bands are used, such as the Association of Radio Industries and Businesses (ARIB)-defined band in Japan, which operates at 10-450 kHz, and the Electric Power Research Institute (EPRI)-defined bands in China, which operates at 3-90 kHz.

SUMMARY OF THE INVENTION

Embodiments of methods and systems for adaptive sub-band point-to-point communication are presented. In one embodiment a method includes performing functions using a power line communication (PLC) transmitter device. The method may include generating a first data packet having a first adaptive sub-band information set, the first sub-band information set comprising information to be used by a PLC receiver for determining a sub-band hopping pattern. The method may also include transmitting the first data packet on a first PLC sub-band. Additionally, the method may include hopping to a second PLC sub-band, and generating a second data packet having a second adaptive sub-band information set, the second sub-band information set comprising information to be used by the PLC receiver for determine the sub-band hopping pattern. The method may further include transmitting the second data packet on the second PLC sub-band.

In an embodiment, the method may additionally include receiving a user input for configuring point-to-point PLC communication with the PLC receiver via a graphical user interface (GUI).

In one embodiment, the method includes transmitting the first data packet and transmitting the second data packet are performed according to a File Transfer mode of operation. In such an embodiment, the first adaptive sub-band information set and the second adaptive sub-band information set comprise an adaptive sub-band header in the first data packet and the second data packet respectively.

In another embodiment, the method may include transmitting the first data packet and transmitting the second data packet are performed according to a PHY mode of operation. In such an embodiment, the first adaptive sub-band information set and the second adaptive sub-band information set comprise a portion of the data payload of the first data packet and the second data packet respectively.

In one embodiment, the first adaptive sub-band information set comprises an identifier of the first PLC sub-band. The second adaptive sub-band information set may include an identifier of the second PLC sub-band. The first adaptive sub-band information set and the second adaptive sub-band information set may include information defining a sub-band hopping sequence pattern. The first adaptive sub-band information set and the second adaptive sub-band information set may include a timestamp of a sub-band transition to the first PLC sub-band and to the second PLC sub-band respectively. The first adaptive sub-band information set and the second adaptive sub-band information set may include information defining a duration of time the transmitter will transmit on the first PLC sub-band and the second PLC sub-band respectively.

In one embodiment, the method includes terminating CSMA/CA delay of transmissions in response to receipt of a data packet from the PLC receiver. In such an embodiment, the method includes fully utilizing the sub-band duration in each of the sub-bands in response to receipt of the data packet from the PLC receiver, wherein the data packet indicates that the PLC receiver is synchronized to the PLC transmitter device.

Another embodiment of a method may be performed by a power line communication (PLC) receiver device. In such an embodiment, the method includes receiving a first data packet having a first adaptive sub-band information set, the first sub-band information set comprising information from a PLC transmitter. The method may further include extracting the first sub-band information set from the first data packet. Additionally, the method may include analyzing the first sub-band information set to determine a transmitter sub-band hopping pattern. The method may also include setting a corresponding receiver sub-band hopping pattern synchronized to the sub-band hopping patter used by the PLC transmitter. Also, the method may include hopping to a subsequent sub-band as defined by the receiver sub-band hopping pattern.

In such an embodiment, the PLC receiver device may be initially configured to hop sub-bands at an initial hopping rate that is faster than a hopping rate of PLC transmitter. Alternatively, the PLC receiver device may be initially configured to hop sub-bands at an initial hopping rate that is slower than a hopping rate of the PLC transmitter.

An embodiment of a system may include a PLC transmitter device and a PLC receiver device. In one embodiment, the PLC transmitter device may be configured to generate a first data packet having a first adaptive sub-band information set. Additionally, the PLC transmitter device may be configured to transmit the first data packet on a first PLC sub-band, hop to a second PLC sub-band, generate a second data packet having a second adaptive sub-band information set, the second sub-band information set, and transmit the second data packet on the second PLC sub-band. In one embodiment, the PLC receiver device may be configured to receive at least one of the first data packet having the first adaptive sub-band information set or the second data packet having the second adaptive sub-band information set, extract at least one of the first sub-band information set from the first data packet or the second sub-band information set from the second data packet, analyze the at least one of the first sub-band information set or the second sub-band information set to determine a transmitter sub-band hopping pattern, set a corresponding receiver sub-band hopping pattern synchronized to the sub-band hopping patter used by the PLC transmitter device, and hop to a subsequent sub-band as defined by the receiver sub-band hopping pattern.

In a further embodiment, the PLC transmitter device may transmit the first data packet and the second data packet according to a File Transfer mode of operation. The first adaptive sub-band information set and the second adaptive sub-band information set comprise an adaptive sub-band header in the first data packet and the second data packet respectively.

Alternatively, the PLC transmitter device may transmit the first data packet and the second data packet according to a PHY mode of operation. The first adaptive sub-band information set and the second adaptive sub-band information set may include a portion of the data payload of the first data packet and the second data packet respectively.

In one embodiment, the PLC receiver device is initially configured to hop sub-bands at an initial hopping rate that is faster than a hopping rate of PLC transmitter. Alternatively, the PLC receiver device is initially configured to hop sub-bands at an initial hopping rate that is slower than a hopping rate of the PLC transmitter.

BRIEF DESCRIPTION OF THE DRAWINGS

Having thus described the invention in general terms, reference will now be made to the accompanying drawings, wherein:

FIG. 1 is a diagram of a PLC system according to some embodiments.

FIG. 2 is a block diagram of a PLC device or modem according to some embodiments.

FIG. 3 is a block diagram of a PLC gateway according to some embodiments.

FIG. 4 is a block diagram of a PLC data concentrator according to some embodiments.

Figure 5:
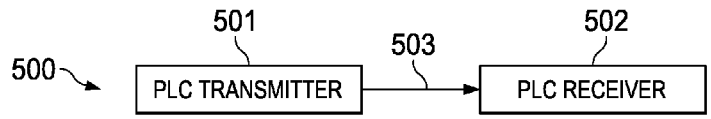

FIG. 5 is a schematic block diagram illustrating one embodiment of a system configured for point-to-point PLC.

Figure 6:
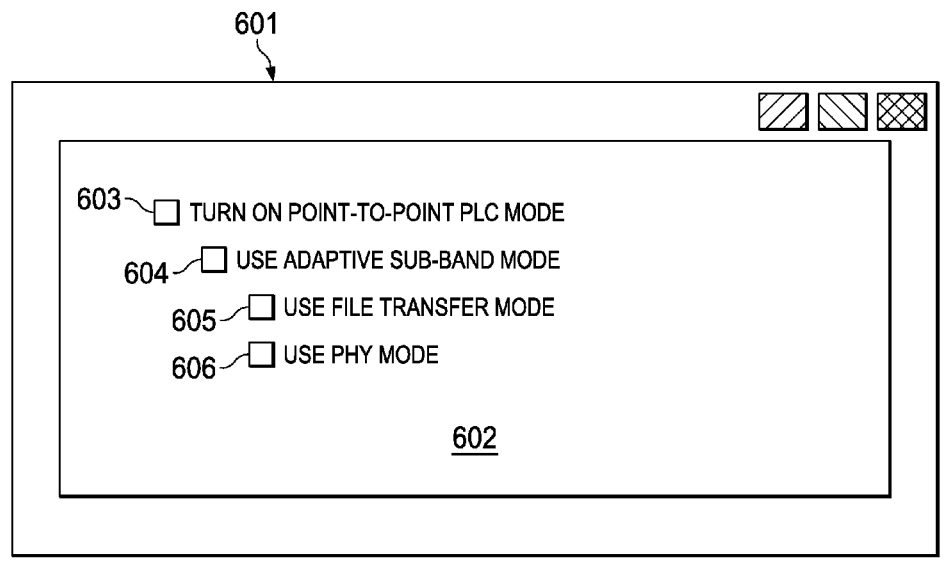

FIG. 6 is diagram illustrating one embodiment of an adaptive sub-band algorithm for use in point-to-point PLC systems.

Figure 7:
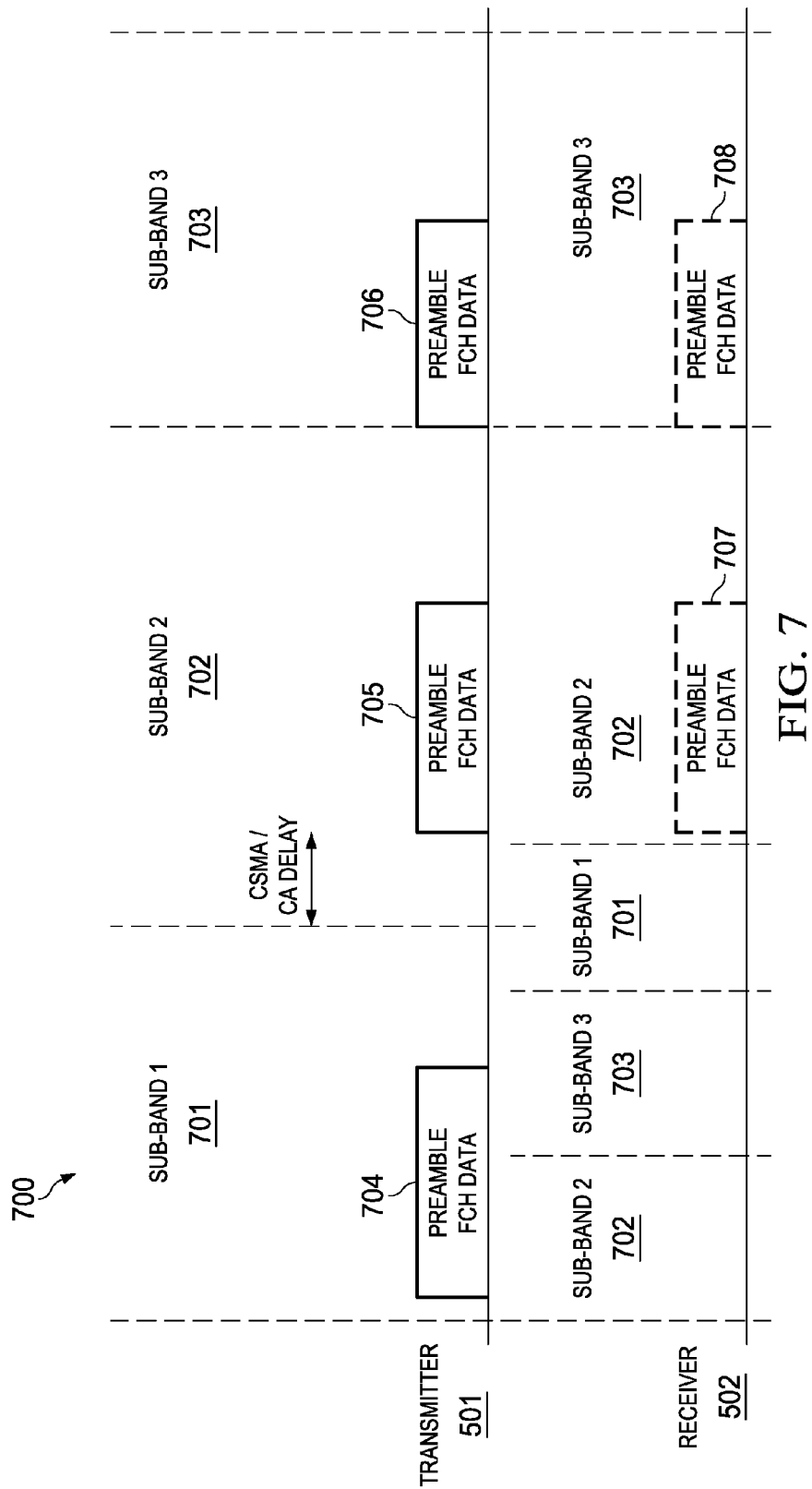

FIG. 7 is an illustration of one embodiment of a GUI that may be configured for use with the present embodiments.

Figure 8A:
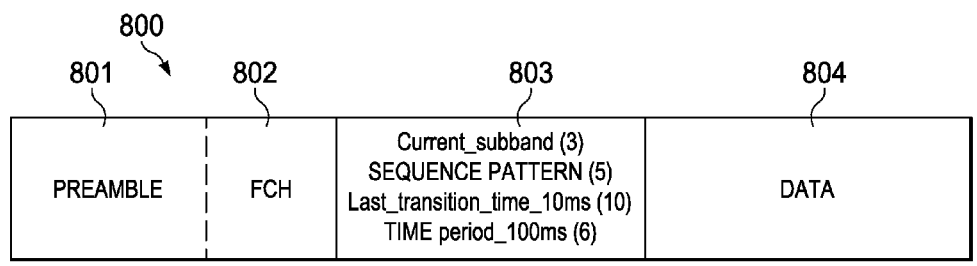

FIG. 8A is a diagram illustrating one embodiment of an adaptive sub-band packet header configuration for use in PHY testing mode operation.

Figure 8B:
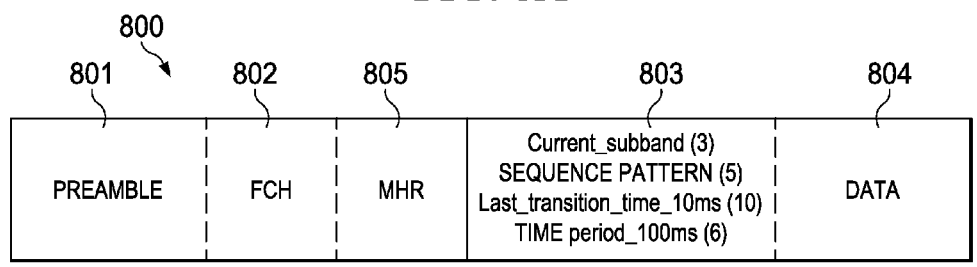

FIG. 8B is a diagram illustrating one embodiment of an adaptive sub-band packet header configuration for use in a file transfer mode of operation.

FIG. 9 is a schematic flowchart diagram illustrating one embodiment of a method for adaptive sub-band point-to-point communication in PLC networks.

FIG. 10 is a illustrating one embodiment of a method for adaptive sub-band point-to-point communication in PLC networks.

FIG. 11 is a block diagram of an integrated circuit according to some embodiments.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 illustrates a PLC system according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102*a-n*. Although referred to as "residences," premises 102*a-n* may include any type of building, facility, electric vehicle charging station, or other location where electric power is received and/or consumed. A breaker panel, such as panel 107, provides an interface between meter 106*n* and electrical wires 108 within residence 102*n*. Electrical wires 108 deliver power to outlets 110, switches 111 and other electric devices within residence 102*n*.

The power line topology illustrated in FIG. 1 may be used to deliver high-speed communications to residences 102*a-n*. In some implementations, power line communications modems or gateways 112*a-n* may be coupled to LV power lines 105 at meter 106*a-n*. PLC modems/gateways 112*a-n* may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102*a-n*. Thus, by using existing electricity distribution systems to carry data signals, significant cost savings are possible.

An illustrative method for transmitting data over power lines may use a carrier signal having a frequency different from that of the power signal. The carrier signal may be modulated by the data, for example, using an OFDM technology or the like described, for example, by the PRIME, G3 or IEEE 1901 standards.

PLC modems or gateways 112*a-n* at residences 102*a-n* use the MV/LV power grid to carry data signals to and from PLC data concentrator or router 114 without requiring additional wiring. Concentrator 114 may be coupled to either MV line 103 or LV line 105. Modems or gateways 112*a-n* may support applications such as high-speed broadband Internet links, narrowband control applications, low bandwidth data collection applications, or the like. In a home environment, for example, modems or gateways 112*a-n* may further enable home and building automation in heat and air conditioning, lighting, and security. Also, PLC modems or gateways 112*a-n* may enable AC or DC charging of electric vehicles and other appliances. An example of an AC or DC charger is illustrated as PLC device 113. Outside the premises, power line communication networks may provide street lighting control and remote power meter data collection.

One or more PLC data concentrators or routers 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

FIG. 2 is a block diagram of PLC device 113 according to some embodiments. As illustrated, AC interface 201 may be coupled to electrical wires 108*a* and 108*b* inside of premises 112*n* in a manner that allows PLC device 113 to switch the connection between wires 108*a* and 108*b* off using a switching circuit or the like. In other embodiments, however, AC interface 201 may be connected to a single wire 108 (i.e., without breaking wire 108 into wires 108*a* and 108*b*) and without providing such switching capabilities. In operation, AC interface 201 may allow PLC engine 202 to receive and transmit PLC signals over wires 108*a-b*. In some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112*n* (e.g., street lighting, etc.).

PLC engine 202 may be configured to transmit and/or receive PLC signals over wires 108*a* and/or 108*b* via AC interface 201 using a particular frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108*a*, and/or 108*b*. PLC engine 202 may receive such power consumption information, encode it as one or more PLC signals, and transmit it over wires 108, 108*a*, and/or 108*b* to higher-level PLC devices (e.g., PLC gateways 112*n*, data aggregators 114, etc.) for further processing. Conversely, PLC engine 202 may receive instructions and/or other information from such higher-level PLC devices encoded in PLC signals, for example, to allow PLC engine 202 to select a particular frequency band in which to operate.

FIG. 3 is a block diagram of PLC gateway 112 according to some embodiments. As illustrated in this example, gateway engine 301 is coupled to meter interface 302, local communication interface 304, and frequency band usage database 304. Meter interface 302 is coupled to meter 106, and local communication interface 304 is coupled to one or more of a variety of PLC devices such as, for example, PLC device 113. Local communication interface 304 may provide a variety of communication protocols such as, for example, ZigBee, Bluetooth, Wi-Fi, Wi-Max, Ethernet, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102*n* and serve as a gateway to all PLC communications to and/or from premises 102*n*. In other embodiments, however, PLC gateway 112 may be absent and PLC devices 113 (as well as meter 106*n* and/or other appliances) may communicate directly with PLC data concentrator 114. When PLC gateway 112 is present, it may include database 304 with records of frequency bands currently used, for example, by various PLC devices 113 within premises 102*n*. An example of such a record may include, for instance, device identification information (e.g., serial number, device ID, etc.), application profile, device class, and/or currently allocated frequency band. As such, gateway engine 301 may use database 305 in assigning, allocating, or otherwise managing frequency bands assigned to its various PLC devices.

FIG. 4 is a block diagram of PLC data concentrator or router 114 according to some embodiments. Gateway interface 401 is coupled to data concentrator engine 402 and may be configured to communicate with one or more PLC gateways 112*a-n*. Network interface 403 is also coupled to data concentrator engine 402 and may be configured to communicate with network 120. In operation, data concentrator engine 402 may be used to collect information and data from multiple gateways 112*a-n* before forwarding the data to control center 130. In cases where PLC gateways 112*a-n* are absent, gateway interface 401 may be replaced with a meter and/or device interface (now shown) configured to communicate directly with meters 116*a-n*, PLC devices 113, and/or other appliances. Further, if PLC gateways 112*a-n* are absent, frequency usage database 404 may be configured to store records similar to those described above with respect to database 304.

FIG. 5 is a schematic block diagram illustrating one embodiment of a system 500 configured for point-to-point PLC. The system 500 may include a PLC transmitter 501 and a PLC receiver 502. For example, a PLC gateway 112 may be configured as the PLC transmitter 501 and a PLC device 113 may be configured as the PLC receiver 502. Alternatively, the PLC device 113 may be configured as the PLC transmitter 501 and the PLC gateway 112 may be configured as the PLC receiver 502. In still a further embodiment, the data concentrator 114 may be configured as either the PLC transmitter 501 or the PLC receiver 502 and configured in combination with a PLC gateway 112 or a PLC device 113 in a point-to-point system 500. In still a further embodiment, a plurality of PLC devices 113 may be configured to communicate directly in a point-to-point PLC system 500 as described in FIG. 5. Additionally, the substation 101 may be configured in a point-to-point system 500 as described above. On of ordinary skill in the art will recognize a variety of suitable configurations for the point-to-point PLC system 500 described in FIG. 5.

FIG. 6 illustrates one embodiment of a GUI 601 that may be configured for use with the present embodiments. The GUI 601 may include a user control panel 602. The user control panel 602 may include one or more user controls 603-606. For example, the GUI 601 may include a user control 603 for turning on and/or off point-to-point PLC mode on the transmitter 501 or the receiver 502. In one embodiment, the user control 603 may be a selectable button, box, or the like. In a further embodiment, the GUI may include a second user control 604 for allowing a user to select adaptive sub-band mode of operation. A fourth user control 605 may allow a user to select a File Transfer mode of operation. A fifth user control 606 may allow a user to select a PHY testing mode of operation. One of ordinary skill in the art will recognize a variety of GUI configurations and arrangements which may be suitable for use with the present embodiments. Although the GUI 601 is presented as one embodiment of a method for configuring the PLC transmitter 501 and/or PLC receiver 502, one of ordinary skill will recognize alternative methods for configuring these devices.

As illustrated in FIG. 7, the PLC transmitter 501 may be configured to transmit data via a point-to-point connection 503 to the PLC receiver 502. FIG. 7 is diagram illustrating one embodiment of an adaptive sub-band algorithm 700 for use in point-to-point PLC systems 500.

In one embodiment, a user may specify that the adaptive sub-band mode of operation using the intermediate GUI 601. One of the nodes in system 500 is configured to be the PLC transmitter 501 and the other node is configured to be the PLC receiver 502. The PLC transmitter 501 may have a fixed hopping pattern of the sub-bands 701-703 and transmit packets 704-706 for a fixed duration of time in each of sub-bands 701-703 respectively. The PLC receiver 502 may initially wait for a brief duration of time in each of the sub-bands 704-706 in a time-sliced fashion, and try to lock-in to the transmitter pattern. It will receive the packets 704-706 from the PLC transmitter 501 eventually in at least one of the sub-bands 601-603. When the receiver 502 receives the first frame, the transmitter 501 would have included the start time for the current sub-band, the time spent in each sub-band and the hopping pattern associated with each of the sub-bands. Therefore, the receiver 502 would have locked on to the transmitter even if it has received a single frame. The details of the frame format are discussed in below in FIGS. 8A-B.

For illustrative purposes, three sub-bands have been shown in FIG. 7. For simplification of explanation, assume that the transmitter spends eight second each in every sub-band 701-703. During the eight second time slot, the PLC transmitter 501 sends as many frames as possible using either CSMA/CA (file transfer mode of p2p operation) or using the PHY testing mode (RAMP data). The PLC transmitter 501 includes in each frame an adaptive sub-band information set, which includes the start of the current sub-band, the hopping sequence and the time elapsed from the last sub-band transition along with the time period spent in each sub-band.

Further assuming that the PLC receiver 502 spends approximately two seconds in each of the sub-bands in a cyclic repetitive fashion. In this case the receiver would have spent at least a portion of time, for example two seconds or more, in each of the three sub-bands 701-703. If this is one of the desired sub-bands in terms of PHY connectivity, the receiver 502 will be able to lock on to at least one packet received in this sub-band. In such an embodiment, even the reception of a single packet will allow the receiver 502 to determine the hopping pattern used by the transmitter 501 and the duration spent in each of the sub-bands. Thus, the hopping pattern of the receiver 502 may be synchronized with the hopping pattern of the transmitter 501.

The worst case delay for the receiver to synchronize to the transmitter pattern will be one cycle duration spent by the transmitter across all sub-bands, which corresponds to twenty-four seconds in the above example. After the receiver has locked on to the transmitter pattern, it can at least listen to all transmissions in the sub-band used for the initial synchronization, and can correct any clock drifts. If the test is performed for long enough duration, for example greater than twenty minutes, the initial synchronization period will be small, for example less than two percent, and the performance results will be representative of the performance observed in each sub-band.

In another embodiment, the receiver 502 may transition between sub-bands much slower than the transmitter 501. For example, the inverse of the example described above may be implemented, where the transmitter 501 spends two seconds in each sub-band 701-703 and the receiver 502 spends eight seconds in each sub-band 701-703. In such an embodiment, the receiver 502 may be able to lock on to the hopping patter upon receipt of the first data packet 704 received from the transmitter 501.

To enable or disable the adaptive sub-band mode, the user may be allowed to make a selection, such as checking a box or not in the intermediate GUI 601. If the box 604 is checked for a transmitter 501, the transmitter 501 may include the additional header format described below. Similarly, at the receiver 502, if the box 604 is checked, the first three bytes following the PHY FCH or MHR (depending on the mode of operation), may be treated as the adaptive sub-band header as shown in FIGS. 8A-B.

The transmitter 501 may embed the adaptive sub-band information set 803 in the packet 800 as shown in FIGS. 8A-B. The current sub-band indicates the current sub-band used for the transmission. The sequence pattern indicates the pattern of sub-bands to follow using the current sub-band as the reference. In the example with three sub-bands, if the transmitter 501 is operating in the second sub-band 702, the number of possibilities for different patterns with the second sub-band 702 as reference is 2P1=2. Similarly, if there are four sub-bands, the number of possibilities will be at most 3P1=6. The number of sub-bands may be limited, depending on the number of bits allocated for the sequence pattern. For example, if five bits are allocated, then the number patterns may be limited to five sub-bands. In addition to the sub-band and sequence pattern information, the transmitter 501 may include the last transition time from the previous sub-band. In one embodiment, the last transmission time may be recorded at a granularity of 10s of milliseconds (ms). Similarly, the transmitter 501 may also include the time period in 100s of ms spent on each sub-band.

FIG. 8A is a diagram illustrating one embodiment of an adaptive sub-band packet configuration for use in PHY testing mode operation. For the PHY testing mode, as indicated in FIG. 8A, there is no MAC header or MAC CRC 16. The receiver PHY may perform Bit Error Rate (BER) checks based on the byte pattern received. Since the BER for the PHY testing mode will be affected if we were to include the adaptive sub-band information set in the header the information set may be included after the PHY FCH for this mode of operation.

The receiver 502 upon receiving the adaptive sub-band information set and the RAMP data information will parse the payload to separate the adaptive sub-band information set from the RAMP data. In one embodiment, the adaptive sub-band information set may comprise the first three bytes of the payload data.

FIG. 8B is a diagram illustrating one embodiment of an adaptive sub-band packet header configuration for use in a file transfer (FTP) mode of operation. In this embodiment, FTP is used at the higher layers, and the MHR and the CRC 16 are present in the MAC PDU created at the transmitter 501. Therefore, the adaptive sub-band information set may be added after the MHR in this embodiment. The PHY may perform the CRC 16 verification either including the adaptive sub-band information set or using the remaining bytes. In this case, CSMA/CA may be performed. This mode may not be useful if TCP is used and if the network exhibits asymmetric connectivity when using the sub-bands since the ACK sent in the reverse direction may not reach the transmitter. In such an embodiment, CSMA/CA may be terminated upon receipt of a response packet from the receiver 502 and a determination that hop synchronization has been achieved.

FIG. 9 is a schematic flowchart diagram illustrating one embodiment of a method for adaptive sub-band point-to-point communication in PLC networks. In one embodiment, the method 900 starts when the PLC transmitter 501 generates 901 a first data packet 704 having a first adaptive sub-band information set 803. The PLC transmitter 501 may then transmit 902 the first data packet 704 on the first PLC sub-band 701. In one embodiment, the PLC transmitter 501 may transmit multiple copies of the first data packet 704 on the first sub-band 701. Next, at a designated time, the PLC transmitter hops 903 to a second PLC sub-band 702. The PLC transmitter 501 then generates 904 a second data packet 705 having a second adaptive sub-band information set 803 and transmits 905 the second data packet 705 on the second PLC sub-band 702.

FIG. 10 is a illustrating one embodiment of a method 1000 for adaptive sub-band point-to-point communication in PLC networks. In one embodiment, the PLC receiver 502 receives 1001 a first data packet 704 having a first adaptive sub-band data set 803 from a PLC transmitter 501. The PLC receiver 502 then extracts 1002 the first adaptive sub-band information set 803 from the first data packet 704. The receiver 502 may then analyze 1003 the first adaptive sub-band information set to determine a sub-band hopping pattern of the transmitter 501. The receiver 502 then set 1004 a corresponding receiver sub-band hopping pattern which is synchronized to the sub-band hopping pattern used by the PLC transmitter 501. The receiver 502 may then hop 1005 to a subsequent sub-band as defined by the receiver sub-band hopping pattern.

FIG. 11 is a block diagram of a circuit for implementing adaptive sub-band point-to-point communication according to some embodiments. In some cases, one or more of the devices and/or apparatuses shown in FIGS. 1-4 may be implemented as shown in FIG. 10. In some embodiments, processor 1102 may be a digital signal processor (DSP), an application specific integrated circuit (ASIC), a system-on-chip (SoC) circuit, a field-programmable gate array (FPGA), a microprocessor, a microcontroller, or the like. Processor 1102 is coupled to one or more peripherals 1104 and external memory 1103. In some cases, external memory 1103 may be used to store and/or maintain databases 304 and/or 404 shown in FIGS. 3 and 4. Further, processor 1102 may include a driver for communicating signals to external memory 1103 and another driver for communicating signals to peripherals 1104. Power supply 1101 provides supply voltages to processor 1102 as well as one or more supply voltages to memory 1103 and/or peripherals 1104. In some embodiments, more than one instance of processor 1102 may be included (and more than one external memory 1103 may be included as well).

Peripherals 1104 may include any desired circuitry, depending on the type of PLC system. For example, in an embodiment, peripherals 1104 may implement local communication interface 303 and include devices for various types of wireless communication, such as Wi-Fi, ZigBee, Bluetooth, cellular, global positioning system, etc. Peripherals 1104 may also include additional storage, including RAM storage, solid-state storage, or disk storage. In some cases, peripherals 1104 may include user interface devices such as a display screen, including touch display screens or multi-touch display screens, keyboard or other input devices, microphones, speakers, etc.

External memory 1103 may include any type of memory. For example, external memory 1103 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, DRAM, etc. External memory 1103 may include one or more memory modules to which the memory devices are mounted, such as single inline memory modules (SIMMs), dual inline memory modules (DIMMs), etc.

It will be understood that in various embodiments, the modules shown in FIGS. 2-4 may represent sets of software routines, logic functions, and/or data structures that are configured to perform specified operations. Although these modules are shown as distinct logical blocks, in other embodiments at least some of the operations performed by these modules may be combined in to fewer blocks. Conversely, any given one of the modules shown in FIGS. 2-4 may be implemented such that its operations are divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

What is claimed is:

1. A method comprising:
   performing, by a power line communication (PLC) transmitter device,
   generating a first data packet having a first adaptive sub-band information set, the first sub-band information set comprising information to be used by a PLC receiver for determining a sub-band hopping pattern;
   transmitting the first data packet on a first PLC sub-band;
   hopping to a second PLC sub-band;
   generating a second data packet having a second adaptive sub-band information set, the second sub-band information set comprising information to be used by the PLC receiver for determine the sub-band hopping pattern including an identifier of at least one of the PLC sub-bands; and
   transmitting the second data packet on the second PLC sub-band.

2. The method of claim 1, further comprising receiving a user input for configuring point-to-point PLC communication with the PLC receiver via a graphical user interface (GUI).

3. The method of claim 1, wherein transmitting the first data packet and transmitting the second data packet are performed according to a File Transfer mode of operation.

4. The method of claim 2, wherein the first adaptive sub-band information set and the second adaptive sub-band information set comprise an adaptive sub-band header in the first data packet and the second data packet respectively.

5. The method of claim 1, wherein transmitting the first data packet and transmitting the second data packet are performed according to a PHY mode of operation.

6. The method of claim 5, wherein the first adaptive sub-band information set and the second adaptive sub-band information set comprise a portion of the data payload of the first data packet and the second data packet respectively.

7. The method of claim 1, wherein the first adaptive sub-band information set comprises an identifier of the first PLC sub-band.

8. The method of claim 1, wherein the second adaptive sub-band information set comprises an identifier of the second PLC sub-band.

9. The method of claim 1, wherein the first adaptive sub-band information set and the second adaptive sub-band information set comprises information defining a sub-band hopping sequence pattern.

10. The method of claim 1, wherein the first adaptive sub-band information set and the second adaptive sub-band information set comprise a timestamp of a sub-band transition to the first PLC sub-band and to the second PLC sub-band respectively.

11. The method of claim 1, wherein the first adaptive sub-band information set and the second adaptive sub-band information set comprises information defining a duration of time the transmitter will transmit on the first PLC sub-band and the second PLC sub-band respectively.

12. The method of claim 1, further comprising terminating CSMA/CA delay of transmissions in response to receipt of a data packet from the PLC receiver.

13. The method of claim 12, further comprising fully utilizing the sub-band duration in each of the sub-bands in response to receipt of the data packet from the PLC receiver, wherein the data packet indicates that the PLC receiver is synchronized to the PLC transmitter device.

14. A system comprising:
   a power line communication (PLC) transmitter device configured to:
      generate a first data packet having a first adaptive sub-band information set;
      transmit the first data packet on a first PLC sub-band;
      hop to a second PLC sub-band;
      generate a second data packet having a second adaptive sub-band information set, the second sub-band information set; and
      transmit the second data packet on the second PLC sub-band; and
   a PLC receiver device communicatively coupled to the PLC transmitter device, the PLC receiver device configured to:
      receive at least one of the first data packet having the first adaptive sub-band information set or the second data packet having the second adaptive sub-band information set;
      extract at least one of the first sub-band information set from the first data packet or the second sub-band information set from the second data packet;
      analyze the at least one of the first sub-band information set or the second sub-band information set to determine a transmitter sub-band hopping pattern;
      set a corresponding receiver sub-band hopping pattern synchronized to the sub-band hopping pattern used by the PLC transmitter device; and
      hop to a subsequent sub-band as defined by the receiver sub-band hopping pattern.

15. The system of claim 14, wherein the first adaptive sub-band information set and the second adaptive sub-band information set comprise an adaptive sub-band header in the first data packet and the second data packet respectively.

16. The system of claim 14, wherein the PLC transmitter device is configured to transmit the first data packet and the second data packet according to a PHY mode of operation.

17. The system of claim 16, wherein the first adaptive sub-band information set and the second adaptive sub-band information set comprise a portion of the data payload of the first data packet and the second data packet respectively.

\* \* \* \* \*